United States Patent
Fan et al.

(10) Patent No.: US 7,421,116 B2
(45) Date of Patent: Sep. 2, 2008

(54) IMAGE PROCESSING METHODS AND SYSTEMS

(75) Inventors: Jian Fan, Cupertino, CA (US); Hui Chao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 10/809,234

(22) Filed: Mar. 25, 2004

(65) Prior Publication Data

US 2005/0213848 A1    Sep. 29, 2005

(51) Int. Cl.
*G06K 9/00*    (2006.01)

(52) U.S. Cl. ..................................... 382/164

(58) Field of Classification Search ................. 382/173, 382/176, 180, 282, 284, 164; 358/1.18, 2.1; 348/578; 707/104.1; 715/517, 530
See application file for complete search history.

(56) References Cited

U.S. PATENT DOCUMENTS

| | | | |
|---|---|---|---|
| 6,199,082 B1 * | 3/2001 | Ferrel et al. | 715/522 |
| 6,557,017 B1 * | 4/2003 | Venable | 715/502 |
| 6,903,751 B2 * | 6/2005 | Saund et al. | 345/619 |
| 7,076,117 B2 * | 7/2006 | Biermann et al. | 382/285 |
| 2002/0048401 A1 | 4/2002 | Boykov et al. | |

FOREIGN PATENT DOCUMENTS

| EP | 1085464 | 3/2001 |
|---|---|---|
| EP | 1186992 | 3/2002 |

OTHER PUBLICATIONS

Mortensen E N—"Visiob-Assistaed Image Editing"—Computer Graphics vol. 33 No. 4 Nov. 1999.

* cited by examiner

Primary Examiner—Jose L. Couso

(57) ABSTRACT

Systems and methods according to the present invention provide techniques to automatically insert an object from one image into a region of another image. The systems and methods require little or no user interaction to allow efficient re-use and updating of existing images, presentations, documents and the like. An object and a container region are identified. Feasible placement location(s) within the container region for the object, as well as an associated scale factor, are determined. If multiple feasible placement locations are identified for a particular scale factor, then one is selected based upon predetermined criteria. The object can then be inserted into the container region and the resulting composite image stored or, alternatively, parameters can be stored which enable object insertion at a subsequent processing step.

26 Claims, 7 Drawing Sheets

IMAGE PROCESSING METHODS AND SYSTEMS

BACKGROUND

The present invention relates generally to image processing systems and, more particularly, to methods and systems for placing an arbitrary object into an arbitrary region.

The reuse of objects, e.g., images, files, etc., in image processing and document production applications is commonplace. Graphic objects may be expensive to create or have unique characteristics which are not readily duplicated and, therefore, are desirable to save and reuse. Thus object libraries can be established to foster object re-use among system users. Examples of applications involving objects and object re-use include presentations and marketing. Computer slide show presentations can be enhanced by inserting re-usable objects into the text or outline being presented. Similarly, marketing brochures can be created or revised by selecting a graphic object from a library of objects and placing the object at a predetermined place within the brochure.

The insertion of an object into a region of, e.g., a document, electronic presentation, an image, etc., raises issues of placement and sizing. Consider the exemplary presentation slide 10 shown in FIG. 1(*a*). Therein, an image 8 fills most of the presentation slide 10 with the exception of region 12. Since this exemplary presentation relates to a discussion of television picture quality, it is desired to insert a graphic of a television 16 (FIG. 1(*b*)) into the region 12. To insert the television graphic 16 into the region 12 of presentation slide 10, both a size (scale) of the television graphic 16 and a placement location of the television graphic within the region 12 must be determined. Typically, this process is performed manually by an author of the presentation slide 10. However, for applications where, e.g., the presentation slide 10 is a template that is frequently re-used, e.g., with different graphic objects as inserts, it is desirable to automate this process.

SUMMARY

Systems and methods according to the present invention provide techniques to insert an object from one image (or the like) into a region of another image (or the like). The systems and methods require little or no user interaction to allow efficient re-use and updating of existing images, presentations, documents and the like. An object and a container region are identified. Feasible placement location(s) for the object within the container region, as well as an associated scale factor, are determined. If multiple feasible placement locations are identified for a particular scale factor, then one is selected based upon predetermined criteria. The object can then be inserted into the container region and the resulting composite stored or, alternatively, parameters can be stored which enable object insertion at a subsequent processing step.

According to an exemplary embodiment of the present invention, a method for image processing includes the steps of identifying a container region and an object to be inserted into the container region, determining a placement location for the object within the container region and a scale factor associated therewith and inserting the object into the container region at the placement location using the scale factor.

According to another exemplary embodiment of the present invention, an image processing system includes a processor for inserting an object from an image into a container region of another image by segmenting the object from the image and the container region from the other image, determining a placement location for the object within the container region and a scale factor associated therewith and inserting the object into the container region at the placement location using the scale factor to generate a composite image and an output device for outputting the composite image.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1A:
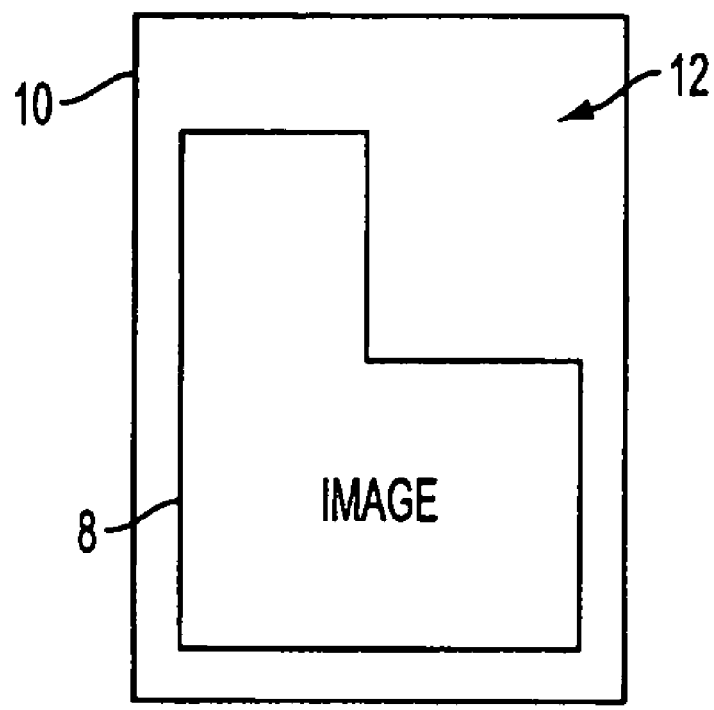
FIGS. 1(*a*) and 1(*b*) depict an image and an object to be inserted into the image, respectively.
Figure 1B:
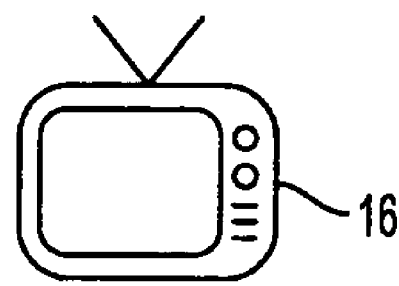
Figure 2:
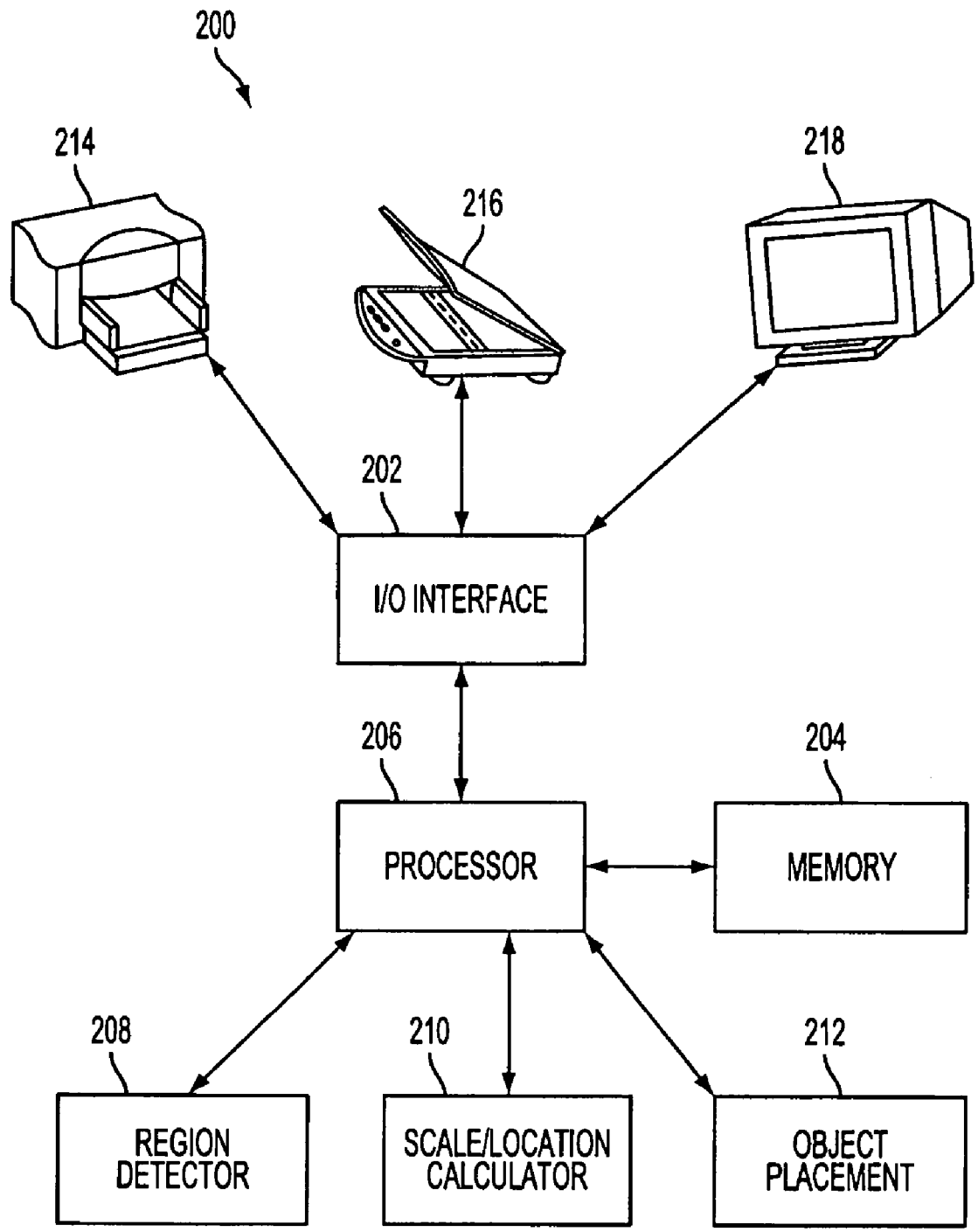
FIG. 2 is an exemplary image processing system.

In order to provide some context for this discussion, an image processing system according to an exemplary embodiment of the present invention will first be described with respect to FIG. 2. Therein, an image processing system 200 includes an I/O interface 202 and a memory device 204 that are connected to a processor 206. These components can be packaged together in, for example, a personal computer. The image processing system 200 further includes a region detector 208, a scale/location calculator 210 and an object placement unit 212 which are connected to processor 206. Although the components 202-212 are illustrated in FIG. 2 as separate components of the image processing system 200, two or more of these components may be integrated, thereby decreasing the number of components included in the image enhancing system. Additionally, the components 208-212 may be implemented in any combination of hardware, firmware and software. According to one exemplary embodiment, components 208-212 can be implemented as a software program(s) that perform the functions of the components 208-212, as described below, when executed by the processor 206. Scanner 216 is connected via I/O interface 202 to capture images for processing by image processing system 200. The I/O interface may be a USB port, a serial port or any other interface port that is designed to interface the scanner 216 to the image processing system 200. Alternatively, the I/O interface 202 may be a network interface to receive digital images from a local network (not shown) or from the Internet (not shown). Additionally, other devices, e.g., a digital camera (not shown), may be connected via I/O interface 202 to capture images for processing by image processing system 200. Printer 214 and monitor 218 are connected to the image processing system 200 via I/O interface 202 to provide output devices for, e.g., the processed image data.

Figure 3A:
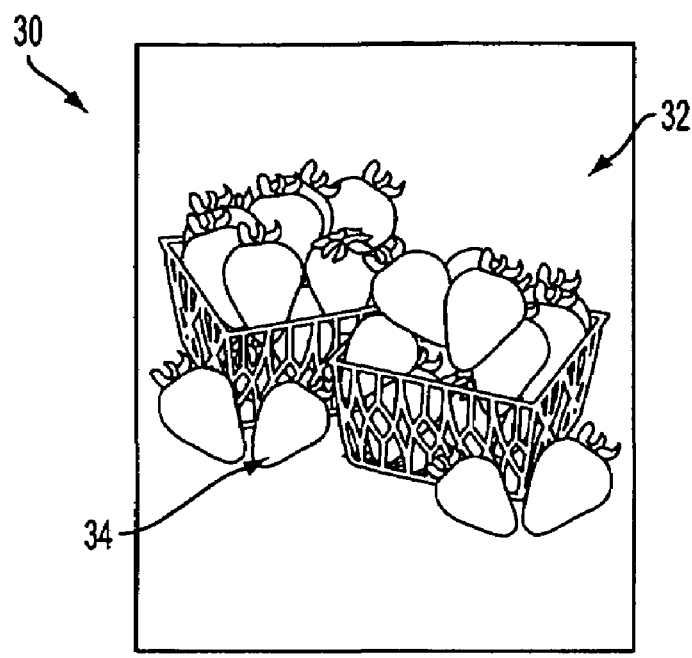
FIGS. 3(*a*) and 3(*b*) depict an exemplary object image and an exemplary container image according to an exemplary embodiment of the present invention.
Figure 3B:
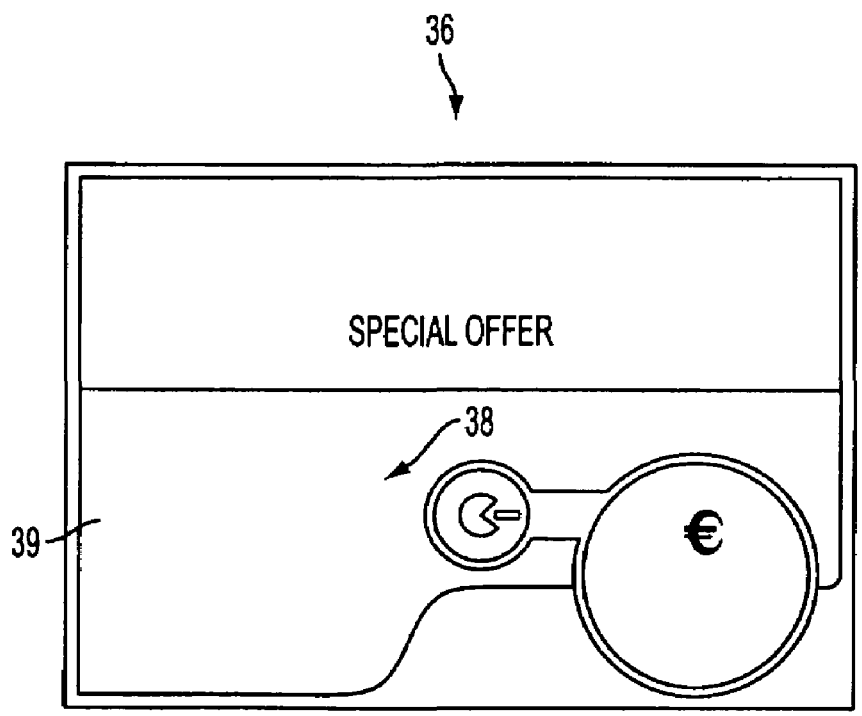

According to exemplary embodiments of the present invention, methods and systems are provided which operate to insert an object having an arbitrary size and shape, e.g., an image, into a region which also has an arbitrary size and shape, e.g., a portion of another image. To illustrate these methods and systems, an exemplary process for inserting the image of two baskets of strawberries (FIG. 3(a)) into a portion of an advertisement for supermarket sale items (FIG. 3(b)) will be described. Note that the image 30 of FIG. 3(a) includes a background portion 32 as well as the object 34 (two baskets of strawberries) to be inserted. The image 36 of FIG. 3(b) includes a container region 38, into which the object 34 is to be inserted. To begin this exemplary process, certain exemplary inputs and/or assumptions are provided a priori. First, a seed location (pixel) 39 is identified within the container region 38. This can be accomplished in different ways. For example, a user can select the seed location using a pointing device (not shown) to select a point on the display 218. For some applications an automated technique can be used to identify the seed location 39. For example, if the object 34 to be inserted is intended to replace an existing object, then one of the pixels of the existing object can be selected as the seed location. Second, it is assumed that both the background portion 32 and the container region 38 have a single color associated therewith (although the background portion 32 and the container region 38 can have different colors).

Figure 4:
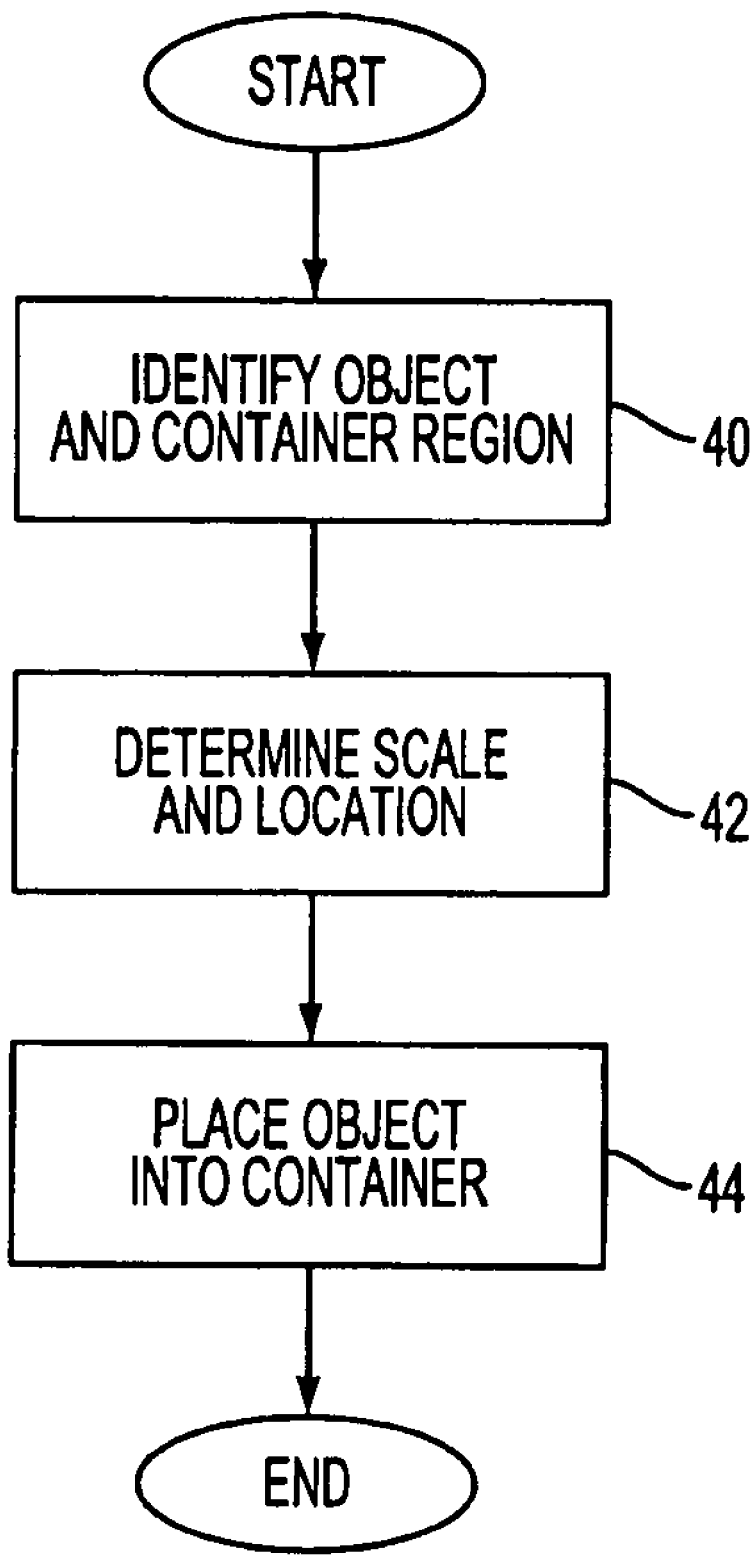
FIG. 4 is a flowchart illustrating an exemplary image processing method according to an exemplary embodiment of the present invention.
Figure 5A:
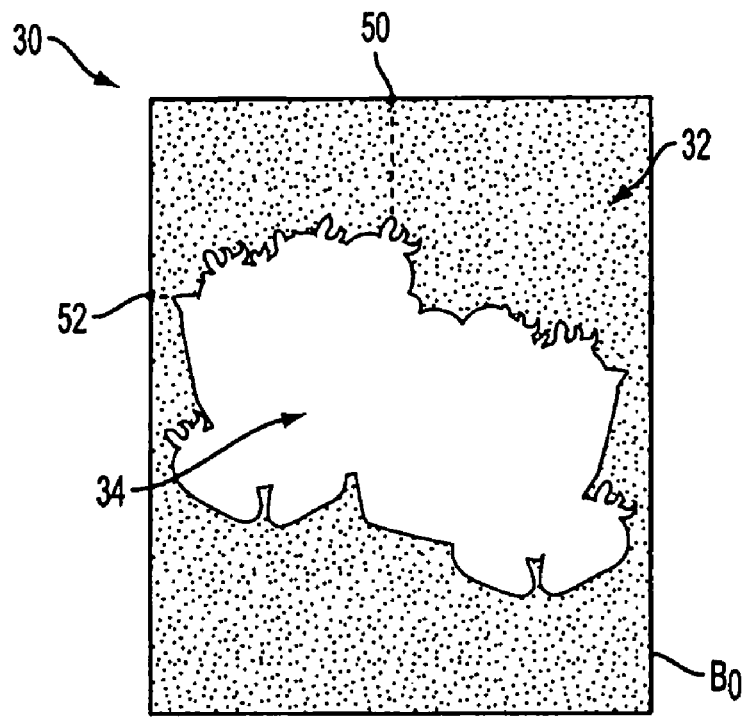
FIGS. 5(*a*) and 5(*b*) illustrate the identification of an object and a container region, respectively, according to an exemplary embodiment of the present invention.
Figure 5B:
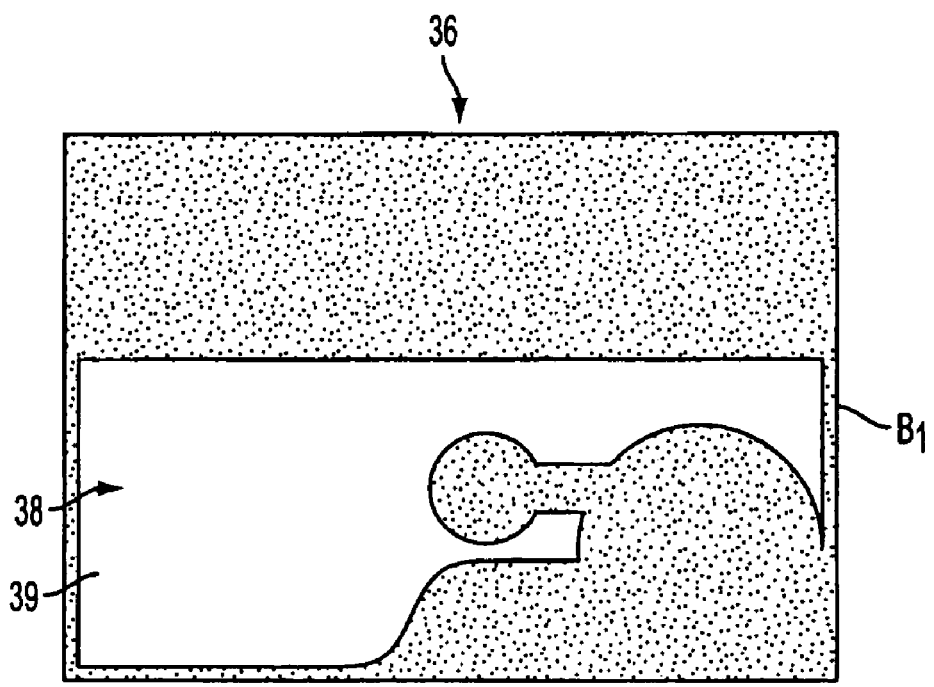

An overall image processing method according to an exemplary embodiment of the present invention is depicted in the flow diagram of FIG. 4. Therein, at step 40, region detector 208 in conjunction with processor 206 identifies the object 34 and the container region 38 by distinguishing the object 34 from the background 32 and the container region 38 from the remainder of image 36. The result of step 40 is depicted graphically in FIGS. 5(a) and 5(b), wherein the same reference numerals are reused from FIGS. 3(a) and 3(b), respectively, and some image details have been omitted.

The container region 38 can, for example, be determined as follows. The seed pixel 39's color value is considered to identify the color of the entire container region 38. Thus pixels surrounding the seed pixel, e.g., beginning with the eight neighboring pixels, are evaluated to determine if they have the same or substantially the same color as the seed pixel 39. If so, they are identified as belonging to the container region 38 and their neighboring pixels are similarly evaluated. This process effectively "grows" a region outwardly from the seed pixel 39 to the boundaries of the container region 38. To make the determination as to whether a given pixel has the same or substantially the same color value as the seed pixel 39, Euclidean distances between color values can be computed. For example, if the seed pixel 39 has a color value of $(r_0,g_0,b_0)$ and a neighboring pixel has a color value of $(r_1,g_1,b_1)$, then the distance d between the colors can be computed as $$d = \sqrt{(r_1 - r_0)^2 + (g_1 - g_0)^2 + (b_1 - b_0)^2}.$$

Then, if d is less than a predetermined threshold, the pixel under consideration can be flagged as belonging to the container region. Using this region growing technique, all of the pixels associated with the image 36 can be segmented as either belonging to the container region 38 or not, which is depicted as white or black, respectively, in FIG. 5(b) and can be stored using, for example, bit values of "1" or "0", respectively. A bounding rectangle $B_1$ can then be determined as, for example, the minimum rectangle that aligns with the image boundary and completely contains the container region 38.

For some applications, it may be desirable to provide some space between the outline of the container region 38 and the outline of the object 34 being inserted. One way to do this is to use a mathematical morphological operator of erosion having a circular structure element to shrink the container region 38. An example of such an erosion operator can be found in the book *Digital Image Processing*, authored by Rafael C. Gonzalez and Paul Wintz, Third Edition, Addison-Wesley, Reading, Massachusetts, 1992, pp. 519-531 the disclosure of which is incorporated here by reference.

The object 34 can be segmented from image 30 in a slightly different manner than the container region 38 since the object 34 may have multiple colors associated therewith. As mentioned above, the background 32 of image 30 is assumed to be one color (which is different from the color(s) of the object 34). Thus a pixel at an edge or a corner of the image 30 can be selected as representative of the background 30's color or the user can specify a background color. Region growing in this case can start from all of the boundary pixels of image 30. Neighboring pixels are tested and identified as either background pixels or object pixels. Growing the background region inwardly from all boundary pixels ensures that all of the background 32 is identified when, for example, the background region is divided into separate sections by the object 34 being segmented. Consider, if the object 34 in FIG. 5(a) was magnified such that edges of the object 34 extended to the boundary of image 30, e.g., at the points 50 and 52 indicated by the dotted lines. In such a case, background region detection which only started with a seed pixel in the upper left hand corner would stop when it reached the portion of object 34 which extends to the boundary of image 30 without having identified the entire boundary region, e.g., the portion proximate the lower right hand portion of image 30. Once region growing is completed for the boundary 32, each pixel in the image 30 can be labeled as background 32 or object 34, for example, using a bit value of "1" or "0", respectively. Again, a bounding rectangle $B_0$ for the object 34 can be computed during the growing process as, for example, the minimum rectangle that aligns with the boundary of the image 30 and completely contains the object 34.

Figure 6:
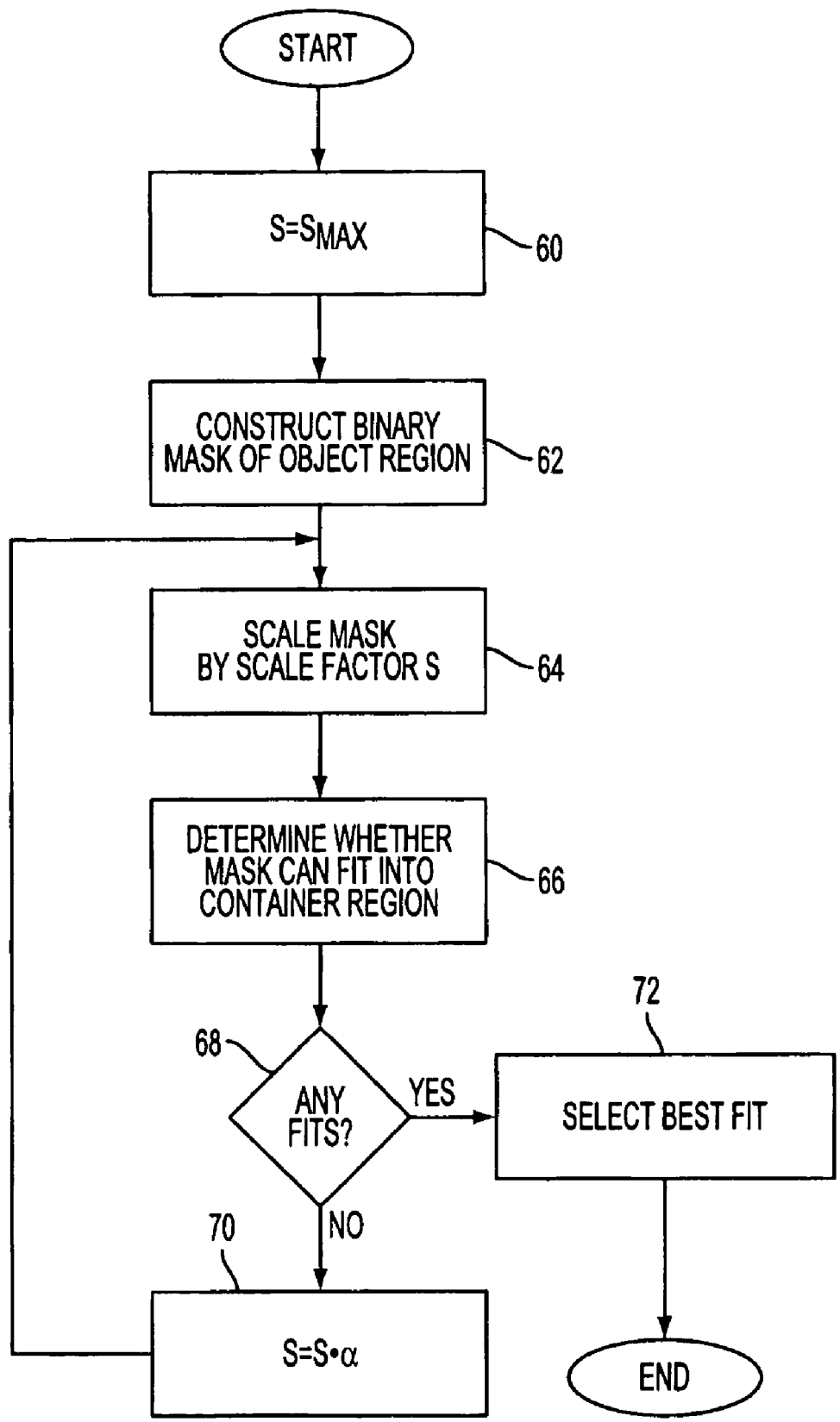
FIG. 6 is a flowchart illustrating a method for determining placement location and scale factor for an object according to an exemplary embodiment of the present invention.

Once the object 34 and the container region 38 are identified at step 40, the process then continues to step 42 wherein a specific location within the container region 38 and a scaling factor s for the object 34 are determined. Initially an upper limit of $s_{max}$ for the object 34 can be determined using the two bounding boxes $B_0$ and $B_1$ by calculating $s_{max} = \min(w_1/w_0, h_1/h_0)$ where $w_i$ and $h_i$ are the width and height (in pixels) of the bounding box $B_i$. Then, both the location and scaling factor can be determined using, for example, the iterative process illustrated by the flow diagram of FIG. 6. Therein, at step 60, the scaling factor s is initialized to be equal to $s_{max}$ so that the first pass of the process attempts to fit the object 34 into the container region 38 at its largest size. A binary mask $M_0$ of the object 34 at its original scale is constructed at step 62 by cropping out the portion of the boundary 32 which lies outside the boundary box $B_0$ from the image 30. A binary mask $M_s$ at the scale s can then be constructed from $M_0$ by using an image interpolation method, e.g., the nearest neighbor method.

Figure 7:
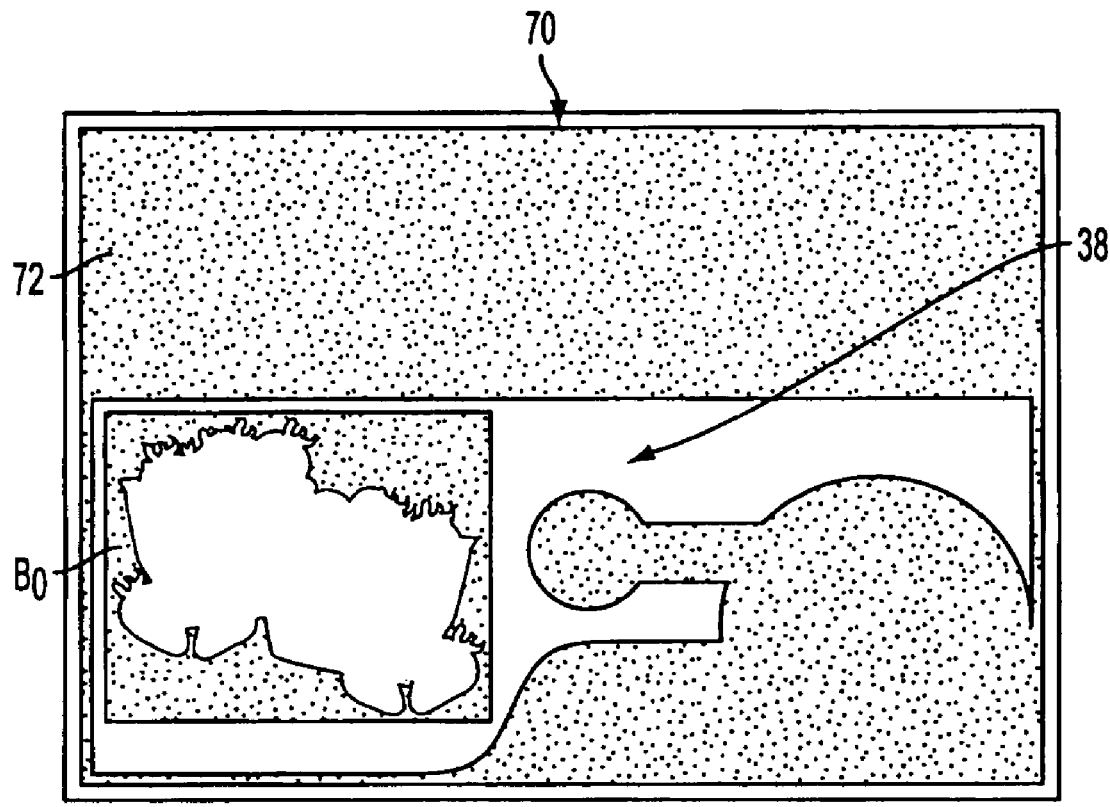
FIG. 7 is a graphical representation of object fitting according to an exemplary embodiment of the present invention.

Next, the scaled version of the binary mask $M_s$ is evaluated relative to the container region 38 to determine the potential placement location(s), if any, at which the scaled version of the binary mask can fit into the container region 38 at step 66. A placement of the mask $M_s$ can be specified by overlaying the mask $M_s$'s origin (e.g., the top-left corner of the mask $M_s$) on a particular pixel coordinate (i,j) of container image 38 as shown in FIG. 7. A placement of the mask $M_s$ is a fit if none of the object pixels overlap with non-container pixels of the image 36. If a placement is a fit, then the pixel coordinate (i,j) is recorded as a feasible placement location. However, as soon as a single object pixel within the binary mask 70 is determined to overlay a non-container pixel of the image 36, then that placement is not a fit and testing of that placement can be terminated. This process is repeated to test each possible placement location for the object 34 within container region 38 by shifting the origin point of the binary mask 70 to overlay each pixel within the container region 38. A detailed exemplary algorithm for performing the overlay pixel comparison between the binary mask and the underlying pixels from image 36 is provided below.

For this example, P(i,j) is a binary image representing the image 36 including the container region 38, in which pixel values of "1" and "0" correspond to the container region 38 and non-container region, respectively, and $h_p$ and $w_p$ are the height and width (in pixels) of P, respectively. Additionally, $M_s(i,j)$ is a binary image representing the scaled binary mask, in which pixel values of "1" and "0" correspond to the object 34 and the background 32, respectively, and $h_m$ and $w_m$ are the height and width (in pixels) of $M_s$, respectively. Then, all feasible placement locations of $M_s$ inside P (with $h_p > h_m$ and $w_p > w_m$) can be found by:

```
For i=0 to (h_p-h_m-1)
    For j=0 to (w_p-w_m-1)
        For m=0 to (h_m-1)
            For n=0 to (w_m-1)
                If M_s(m,n)==1 AND
                    P(i+m,j+n)==0
                    Goto Fail;
                Endif
            EndFor
        EndFor
        Record the location (i,j) as a feasible location.
Fail:   Continue;
    EndFor
EndFor
```

Once all of the possible locations for the binary mask have been tested, the flow moves to step 68 wherein it is checked to see if there were any fits identified during this pass. If there were no fits then the scaling factor is reduced by a percent at step 70 and the process is repeated using a smaller binary mask to attempt to identify one or more possible placement locations for the object 34 within container region 38 at a reduced size. The parameter a is a real number in the range of $0 < \alpha < 1$ which represents a trade off between the speed of the search and the tightness of the fit. Thus, the larger the value of α, the more iterations may be necessary to find a fit, but it is more likely that a tighter fit within the container region 38 will be found. According to one exemplary, but purely illustrative, embodiment a value of α=0.9 can be used. Once one or more fits are found, the flow proceeds to block 72 wherein, if more than one fit were identified, a best fit is selected. A best fit can be selected according to any desired criteria, including, for example, using the mean center of all feasible placement locations. The mean center of all feasible placement locations (i,j) can be calculated by:

$$i_c = \sum_{n=0}^{N-1} i_n / N \text{ and } j_c = \sum_{n=0}^{N-1} j_n / N,$$

where N is the total number of feasible locations. The origin of the placement location for the object 34 can then be selected as $(i_c, j_c)$.

Once a placement location and a scale are determined, the object 34 can be inserted into the container region 38 and the resulting composite image output or saved for subsequent use. Alternatively, systems and methods according to exemplary embodiments of the present invention can save certain parameters associated with the afore-described processing such that the insertion of the object 34 into the container region 38 can be performed later. For some applications, for example, it may be desirable to supply the placement location, the scale, and the object boundary to a rendering application, to actually perform the object insertion or overlay. The boundary of the object in its original scale has already been determined in the above-described procedure and can be represented in at least two ways. One way is to directly use the binary representation of the object generated during the image segmentation process. Although this is an accurate representation, it can result in a large amount of data being stored.

Figure 8:
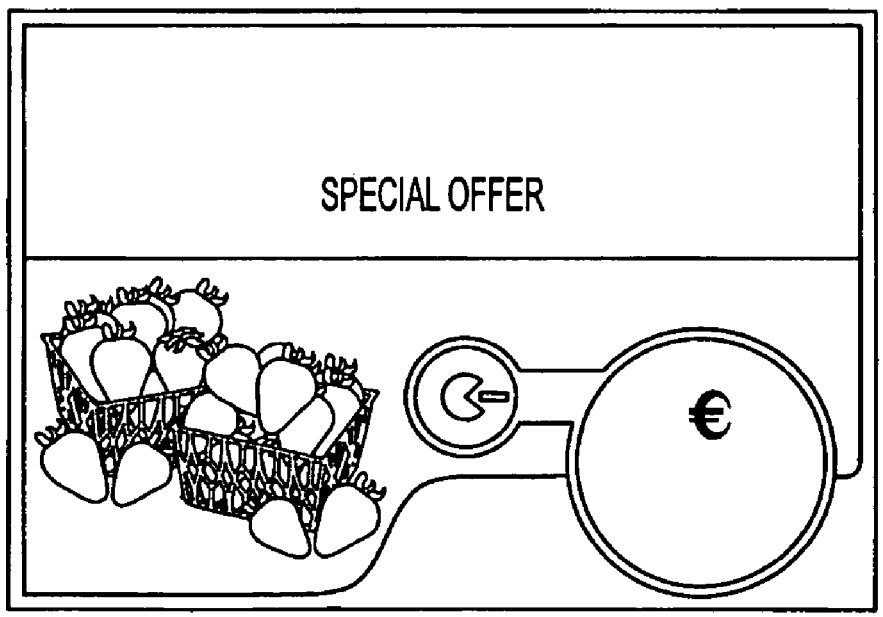
FIG. 8 illustrates a composite image created by inserting an object into a container region based on a stored polygon approximation of the object boundary/region according to an exemplary embodiment of the present invention.

Another approach is to use a polygon to approximate the object boundary of the object 34 at its original scale. First, a mathematical morphological operator of dilation with a circular (e.g., r=2) structuring element is applied to the binary image of object 34 in its original scale. Next, a clockwise or counter-clockwise trace is performed to identify the boundary locations and arrange them in order. The ordered set of locations (points) can then be approximated by a polygon. The criterion used by a so-called "greedy" polygon approximation algorithm is the maximum error of points to the polygon edges. The greedy algorithm starts from the first point and identifies it as the first vertex $v_0$ of the polygon, and then examines the subsequent points in turn. For each point $p_n$ encountered, a line can be constructed connecting the last vertex $v_m$ and $p_n$. If the distances of all the points between $v_m$ and $p_n$ to the line are within a predetermined threshold, then the process moves to the next point in the list. Otherwise, the point $p_n$ last examined is identified as a new vertex $v_{m+1}$. An example of a composite image created by inserting object 34 into the container region 38 during rendering based on a stored polygon approximation of the object boundary/region is provided as FIG. 8.

Systems and methods for image processing according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. For example, those skilled in the art will appreciate that the present invention can be implemented using different sets of inputs/assumptions from which the regions associated with the object to be inserted and the container can be determined. Additionally, the image 36 image may be down-sampled if a dimension associated with the image is large than a predetermined value, e.g., 300 pixels. If down-sampling is employed, the down-sampling factor can be calculated as the ratio of the dimension which exceeds the threshold over the threshold itself. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A computer implemented method for image processing comprising:
    identifying a container region in a first image by evaluating pixels neighboring a seed pixel to determine if said pixels have a same or substantially same color value as said seed pixel; and growing said container region by iteratively identifying pixels having said same or substantially same color value;
    identifying an object in a second image; determining a placement location for the object within said container region and a scale factor associated therewith;
    inserting said object into said container region at said placement location using said scale factor to generate a composite image; and
    outputting said composite image.

2. The computer implemented method of claim 1, wherein identifying said object in a second image further comprises evaluating pixels in a boundary region to determine if said pixels have a same or substantially same color value to as a boundary pixel; and growing said boundary region by iteratively identifying pixels having said same or substantially same color value.

3. The method of claim 1, wherein determining a placement location within said container region and said scale factor associated with said object further comprises
    determining a scale factor;
    determining whether said object will fit into said container region at said scale factor;
    if said object will fit into said container region at at least one location, selecting a placement location for said object; and
    otherwise, reducing said scale factor and determining whether said object will fit into said container region at said reduced scale factor.

4. The method of claim 1, further comprising downsampling said first image prior to identifying said container region.

5. The method of claim 1, wherein selecting said placement location for said object further comprises identifying a plurality of feasible placement locations for said object within said container region at said scale factor; and selecting one of said plurality of feasible placement locations as said placement location.

6. The method of claim 5, wherein selecting one of said plurality of feasible placement locations as said placement location further comprises determining a mean center associated with origin points of said plurality of feasible placement locations; and selecting said mean center as an origin point of said placement location.

7. The method of claim 1, wherein inserting said object into said container region at said placement location using said scale factor further comprises determining a boundary associated with a scaled version of said object; storing said boundary and said placement location; and inserting said object into said container region using said stored boundary and placement location.

8. A computer-readable medium comprising a software program encoded thereon which when executed by a processor causes the processor to perform a method for generating a composite image comprising:
    identifying a container region in a first image by evaluating pixels neighboring a seed pixel to determine if said pixels have a same or substantially same color value as said seed pixel and growing said container region by iteratively identifying pixels having said same or substantially same color value;
    identifying an object in a second image;
    determining a placement location for the object within said container region and a scale factor associated therewith;
    inserting said object into said container region at said placement location using said scale factor to generate a composite image; and
    outputting said composite image.

9. The computer-readable medium of claim 8, wherein identifying said object in a second image further comprises evaluating pixels in a boundary region to determine if said pixels have a same or substantially same color value to as a boundary pixel; and growing said boundary region by iteratively identifying pixels having said same or substantially same color value.

10. The computer-readable medium of claim 8, wherein determining a placement location within said container region and said scale factor associated with said object further comprises
    determining a scale factor;
    determining whether said object will fit into said container region at said scale factor;
    if said object will fit into said container region at at least one location, selecting a placement location for said object; and
    otherwise, reducing said scale factor and determining whether said object will fit into said container region at said reduced scale factor.

11. The computer-readable medium of claim 8, further comprising downsampling said first image prior to identifying said container region.

12. The computer-readable medium of claim 8, wherein selecting said placement location for said object further comprises identifying a plurality of feasible placement locations for said object within said container region at said scale factor; and selecting one of said plurality of feasible placement locations as said placement location.

13. The computer-readable medium of claim 12, wherein selecting one of said plurality of feasible placement locations as said placement location further comprises determining a mean center associated with origin points of said plurality of feasible placement locations; and selecting said mean center as an origin point of said placement location.

14. The computer-readable medium of claim 8, wherein inserting said object into said container region at said placement location using said scale factor further comprises determining a boundary associated with a scaled version of said object; storing said boundary and said placement location;

and inserting said object into said container region using said stored boundary and placement location.

15. An image processing system comprising:
   a processor for inserting an object into a container region by:
   identifying said container region by evaluating pixels neighboring a seed pixel to determine if said pixels have a same or substantially same color value as said seed pixel;
   growing said container region by iteratively identifying pixels having said same or substantially same color value;
   segmenting said object and said container region;
   determining a placement location within said container region for said object and a scale factor associated therewith; and
   inserting said object into said container region at said placement location using said scale factor to generate a composite image; and
   an output device for outputting said composite image.

16. The image processing system of claim 15, wherein said processor identifies said object by evaluating pixels in a boundary region to determine if said pixels have a same or substantially same color value to as a boundary pixel; and growing said boundary region by iteratively identifying pixels having said same or substantially same color value.

17. The image processing system of claim 15, wherein said processor determines a placement location within said container region and said scale factor associated with said object by: determining a scale factor; determining whether said object will fit into said container region at said scale factor; if said object will fit into said container region at at least one location, selecting a placement location for said object; and otherwise, reducing said scale factor and determining whether said object will fit into said container region at said reduced scale factor.

18. The image processing system of claim 15, wherein said processor identifies a plurality of feasible placement locations for said object within said container region at said scale factor; and selects one of said plurality of feasible placement locations as said placement location.

19. The image processing system of claim 18, wherein said processor determines a mean center associated with origin points of said plurality of feasible placement locations and selects said mean center as an origin point of said placement location.

20. The image processing system of claim 15, further comprising: a memory device for storing a boundary associated with a scaled version of said object; wherein said processor inserts said object into said container region using said stored boundary and placement location.

21. The computer implemented method of claim 2 wherein the second image includes the object and a portion which forms a background to the object and wherein the background portion of the second image and the container region of the first image both have the same or substantially same color associated with them.

22. The computer implemented method of claim 1 wherein evaluating pixels neighboring a seed pixel to determine if said pixels have a same or substantially same color value as said seed pixel further comprises determining whether a Euclidean distance between a color value of the seed pixel and a color value of the neighboring pixel is within a predetermined threshold distance.

23. A computer implemented method for image processing comprising:
   identifying a container region in a first image;
   identifying an object in a second image to be inserted into the container region by evaluating pixels in a boundary region to determine if said pixels have a same or substantially same color value to as a boundary pixel; and growing said boundary region by iteratively identifying pixels having said same or substantially same color value;
   inserting said object into said container region to generate a composite image; and
   outputting said composite image.

24. The computer implemented method of claim 23 wherein said boundary region surrounds the object and said boundary region starts growing from pixels forming a boundary of the second image and grows inward toward the object in the second image.

25. A computer-readable medium comprising a software program encoded thereon which when executed by a processor causes the processor to perform a method of generating a composite image comprising:
   identifying a container region in a first image;
   identifying an object in a second image to be inserted into the container region by evaluating pixels in a boundary region to determine if said pixels have a same or substantially same color value to as a boundary pixel; and growing said boundary region by iteratively identifying pixels having said same or substantially same color value;
   inserting said object into said container region to generate a composite image; and
   outputting said composite image.

26. The computer-readable medium of claim 25 wherein said boundary region surrounds the object, and said boundary region starts growing from pixels forming a boundary of the second image and grows inward toward the object in the second image.

* * * * *

UNITED STATES PATENT AND TRADEMARK OFFICE
CERTIFICATE OF CORRECTION

PATENT NO. : 7,421,116 B2 Page 1 of 1
APPLICATION NO. : 10/809234
DATED : September 2, 2008
INVENTOR(S) : Jian Fan et al.

It is certified that error appears in the above-identified patent and that said Letters Patent is hereby corrected as shown below:

In column 8, line 18, in Claim 8, after "pixel" insert -- ; --.

In column 10, line 48, in Claim 26, delete "object," and insert -- object --, therefor.

Signed and Sealed this

Thirteenth Day of January, 2009

JON W. DUDAS
*Director of the United States Patent and Trademark Office*